US010015191B2

(12) United States Patent
Pickett et al.

(10) Patent No.: US 10,015,191 B2
(45) Date of Patent: Jul. 3, 2018

(54) DETECTION OF MAN IN THE BROWSER STYLE MALWARE USING NAMESPACE INSPECTION (71) Applicant: PAYPAL, INC., San Jose, CA (US)

(72) Inventors: Jeremy Dale Pickett, Scottsdale, AZ (US); Brad Wardman, Phoenix, AZ (US)

(73) Assignee: PAYPAL, INC., San Jose, CA (US)

( * ) Notice: Subject to any disclaimer, the term of this patent is extended or adjusted under 35 U.S.C. 154(b) by 488 days.

(21) Appl. No.: 14/030,950

(22) Filed: Sep. 18, 2013

(65) Prior Publication Data
US 2015/0082440 A1 Mar. 19, 2015

(51) Int. Cl.
H04L 29/06 (2006.01)

(52) U.S. Cl.
CPC ................. H04L 63/145 (2013.01)

(58) Field of Classification Search
CPC ...... G06F 21/55; G06F 21/566; G06F 21/565; G06F 21/564; G06F 21/563; G06F 21/562; H04L 29/06
See application file for complete search history.

(56) References Cited

U.S. PATENT DOCUMENTS

| 8,087,080 B1* | 12/2011 | Wan | G06F 11/327 726/22 |
| 8,370,938 B1* | 2/2013 | Daswani | G06F 21/562 726/23 |
| 8,464,318 B1* | 6/2013 | Hallak | H04L 63/1416 726/4 |
| 8,516,590 B1* | 8/2013 | Ranadive | H04L 63/1483 713/187 |
| 8,752,183 B1* | 6/2014 | Heiderich | G06F 21/577 726/22 |
| 8,881,282 B1* | 11/2014 | Aziz | G06F 21/554 726/23 |
| 8,990,945 B1* | 3/2015 | Ranadive | H04L 63/1433 713/187 |
| 9,049,222 B1* | 6/2015 | He | H04L 63/1416 |
| 2006/0174345 A1* | 8/2006 | Flanagan | G06F 21/554 726/24 |
| 2009/0287653 A1* | 11/2009 | Bennett | H04L 63/145 |
| 2011/0030060 A1* | 2/2011 | Kejriwal | G06F 21/566 726/25 |
| 2011/0078794 A1* | 3/2011 | Manni | G06F 21/566 726/23 |

(Continued)

FOREIGN PATENT DOCUMENTS

WO WO 2012094040 A1 * 7/2012 ........... H04L 12/585

Primary Examiner — Scott T Baderman
Assistant Examiner — Sookil J Lee
(74) Attorney, Agent, or Firm — Haynes & Boone, LLP (57) ABSTRACT Methods and systems for detecting fraudulent activity are described. A user types in a web address in his or her browser to request a webpage from a server, and the server communicates the webpage to the user. The communicated webpage includes a document object model (DOM) inspector and/or a JavaScript (JS) namespace inspector. The DOM inspector and JS namespace inspector detect anomalous DOM elements and anomalous JS namespace elements respectively. The DOM inspector and JS namespace inspector discover objects on the rendered webpage that should not be there.

20 Claims, 5 Drawing Sheets (56) References Cited

U.S. PATENT DOCUMENTS

| | | | |
|---|---|---|---|
| 2011/0185271 A1* | 7/2011 | Aciicmez | G06F 21/563 715/234 |
| 2011/0247072 A1* | 10/2011 | Staniford | H04L 63/1416 726/24 |
| 2011/0307955 A1* | 12/2011 | Kaplan | H04L 63/0227 726/23 |
| 2012/0023579 A1* | 1/2012 | Zaitsev | G06F 21/56 726/23 |
| 2012/0124372 A1* | 5/2012 | Dilley | H04L 67/2819 713/162 |
| 2012/0167217 A1 | 6/2012 | McReynolds | |
| 2012/0174224 A1* | 7/2012 | Thomas | G06F 21/566 726/24 |
| 2012/0198528 A1* | 8/2012 | Baumhof | G06F 21/56 726/6 |
| 2013/0055397 A1* | 2/2013 | Amit | H04L 63/1441 726/25 |
| 2013/0111584 A1* | 5/2013 | Coppock | H04L 63/145 726/22 |
| 2013/0263263 A1* | 10/2013 | Narkolayev | G06F 21/51 726/22 |
| 2013/0263270 A1* | 10/2013 | Cote | G06F 21/52 726/24 |
| 2014/0130164 A1* | 5/2014 | Cafasso | H04L 63/1408 726/23 |
| 2014/0282872 A1* | 9/2014 | Hansen | H04L 63/102 726/3 |
| 2014/0283067 A1* | 9/2014 | Call | H04L 63/1425 726/23 |
| 2014/0283068 A1* | 9/2014 | Call | H04L 63/1425 726/23 |
| 2014/0373151 A1* | 12/2014 | Webb | H04L 63/145 726/24 |

* cited by examiner

DETECTION OF MAN IN THE BROWSER STYLE MALWARE USING NAMESPACE INSPECTION

BACKGROUND

Field of the Invention

The present invention generally relates to computer systems, and more particularly to methods for detection of malware in a computer system.

Related Art

Consumers and businesses increasingly rely on computers to store sensitive data. Consequently, malicious programmers seem to continually increase their efforts to gain illegitimate control and access to others' computers and sensitive data. Such malicious programmers continue to create viruses, Trojan horses, worms, and like type programs meant to compromise computer systems and sensitive data belonging to others. These malicious programs are often generally referred to as "malware."

Malicious attacks have evolved to new levels of sophistication. Some extant Trojans facilitate HTML based attacks, for example what are known as "man in the browser" or MITB attacks. In MITB attacks, malware is installed onto a client device that alters the behavior of a web interface. The web interface may be a web browser such as Internet Explorer™, Firefox™, Chrome™, or Safari™, however similar techniques may also be applied to other types of web interfaces including specific or custom applications that provide a portal to network resources.

For example, when a user attempts to contact a known website (such as a bank website), the Trojan substitutes or alters the log in screen. A typical HTML log in screen provided by the bank site may include fields for input of the username, password and RSA token password. In one form of attack, an additional field is provided for the user to complete, for example labeled as "second token password." The compromised interface sends the expected data and the "second token password" to the internet banking server, which can operate and perform the required transaction as normal. Likewise, all form items are sent to an address designated by the malware originator. When coupled with the now known username and password, the second token value facilitates a new fraudulent transaction with the internet banking server. This may be completed by the fraudulent party immediately after the legitimate banking transaction is completed. This is only one example of many possible HTML based attacks. The key feature is that the HTML code is altered so that the customer at a remote computer does not see the interface exactly as intended by the bank, and that the changes assist in facilitating fraud.

Thus, a need exists for systems and methods that can detect MITB-style malware.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems that can be used to detect malware that is attempting to steal or harvest sensitive information from a user. The methods detect the presence of untrusted code running in a browser. Using the knowledge that untrusted code is running while a user is logging into or logged into a website, steps can be taken to reduce risk or apply remediation steps.

A user types in a web address in his or her browser to request a webpage from a server. The server receives the request, retrieves or generates the webpage, and communicates the webpage to the user. The communicated webpage includes a document object model (DOM) inspector and/or a JavaScript (JS) namespace inspector. The DOM inspector detects anomalous DOM elements in the webpage that is rendered on the user device, while the JS namespace inspector detects anomalous JS namespace elements in the webpage that is rendered on the user device. If an anomalous entry is detected, a message that the rendered webpage is compromised can be sent. The DOM inspector and JS namespace inspector discover entries, elements, and objects on the rendered webpage that should not be there—in addition to known malicious entities that have been used in previous attacks.

The term "anomalous" as used herein means deviating from what is standard, normal, or expected. For example, in some embodiments, the DOM inspector enumerates all the DOM elements on a webpage rendered and compares those elements with the normal or expected DOM elements (i.e., the DOM elements that should be on the webpage). The DOM elements that are not the normal or expected DOM elements are anomalous DOM elements.

Webpages may be generally understood to be a document or information resource that is suitable for access via the Internet (or World Wide Web). For example, webpages may be retrieved from a computer, such as a server. Typically, webpages are accessed through a web browser and displayed on a monitor, such as a monitor associated with a laptop or desktop computer, or a display, such as the display of a user device. Often, the information in webpages is in Hypertext Markup Language (HTML), and includes navigation links to other webpages, i.e., hypertext links. Webpages may also include other resources, such as, for example, style sheets, scripts, images, objects, and the like. Webpages are typically transferred using Hypertext Transfer Protocol (HTTP/S).

The present disclosure is concerned with detecting and reporting malicious attacks. In various embodiments, the methods and systems do not themselves prevent or control access to particular websites, or determine what does and does not operate.

Figure 1:
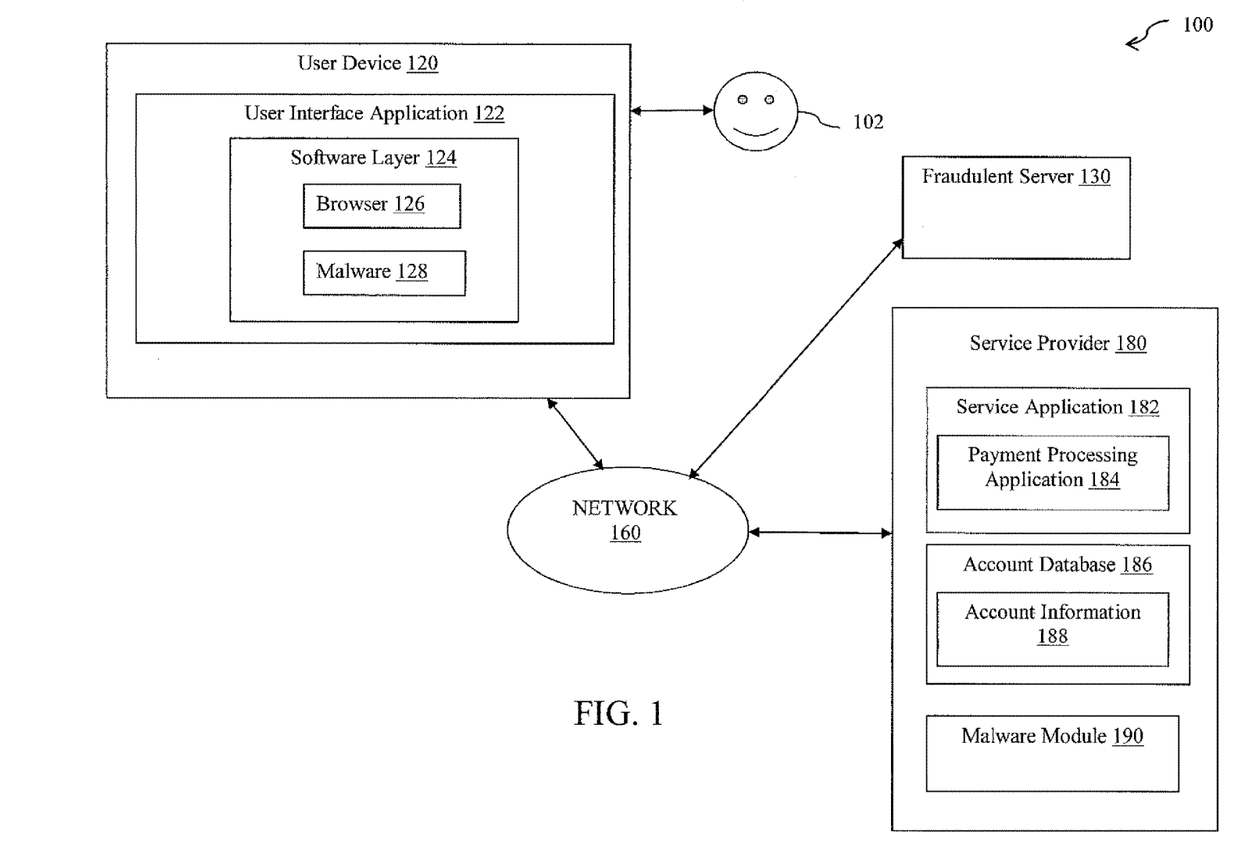
FIG. 1 is a block diagram illustrating a system for detecting fraudulent activity according to an embodiment of the present disclosure.

FIG. 1 shows one embodiment of a block diagram of a network-based system 100 adapted to detect fraudulent activity at a user device 120 over a network 160. As shown, system 100 may comprise or implement a plurality of servers and/or software components that operate to perform various methodologies in accordance with the described embodiments. Exemplary servers may include, for example, stand-alone and enterprise-class servers operating a server OS such as a Microsoft Windows®, a UNIX® OS, a POSIX OS such as Oracle's Solaris®, a Linux® distribution or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, the system 100 includes a user device 120 (e.g., a smartphone), a fraudulent server 130 (e.g., network server device), and at least one service provider server or device 180 (e.g., network server device) in communication over the network 160. The service provider server 180 may communicate information in the form of a webpage to the user device 120 after receiving a request from the user device 120.

The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 120, in various embodiments, may be implemented using any appropriate combination of hardware and/or software configured for wired and/or wireless communication over the network 160. The user device 120, in one embodiment, may be utilized by the user 102 to interact with the service provider server 180 over the network 160. For example, the user 102 may conduct financial transactions (e.g., account transfers) with the service provider server 180 via the user device 120, or send and receive information from the service provider server 180. In various implementations, the user device 120 may be implemented as a personal computer (PC), a smart phone, personal digital assistant (PDA), laptop computer, and/or other types of computing devices capable of transmitting and/or receiving data.

The user device 120, in one embodiment, includes a user interface application 122, which may be utilized by the user 102 to conduct transactions (e.g., shopping, purchasing, bidding, etc.) with the service provider server 180 over the network 160. In one aspect, purchase expenses may be directly and/or automatically debited from an account related to the user 102 via the user interface application 122.

In one implementation, the user interface application 122 comprises a software program, such as a graphical user interface (GUI), executable by a processor that is configured to interface and communicate with the service provider server 180 via the network 160. In another implementation, the user interface application 122 comprises a browser module that provides a network interface to browse information available over the network 160. For example, the user interface application 122 may be implemented, in part, as a web browser to view information available over the network 160.

As shown in FIG. 1, the user interface application 122 includes a software layer 124 that includes a web browser 126 and malware 128. The web browser 126 may be embodied as the Internet Explorer browser developed by Microsoft. The web browser 126 is any software interface that enables access or viewing of webpages or similar visual representations via the Internet or the network 160.

The web browser 126 includes a document object model (DOM) (not shown). The DOM is an interface-oriented application programming interface that enables navigation of a tree of "Node" objects included in a webpage. The DOM provides a representation of a webpage as a structured group of nodes and objects that have properties and methods. For example, a webpage may include objects that may be navigated by the web browser 126 via the DOM. The objects may respectively contain both data components that may be accessed by the web browser 126 and software components that may be executed by the web browser 126. The DOM may enable execution of a webpage to detect whether the webpage has been modified on the user device 120.

As shown, the software layer 124 also includes malware 128. The software layer 124 may have been infected by malware 128 due to the user 102 selecting an email attachment or selecting a link on a webpage. In one embodiment, the malware 128 is MITB-style malware. Typical MITB malware introduces changes to the webpage communicated between the user device 120 and the service provider server 180. Specifically, the user device 120 and the service provider server 180 send content to each other using HTTP messages, and this content that is intended to be communicated between them may be modified (additions may be made, deletions may be made, replacements may be made) by MITB malware. For example, the transaction content can be modified or additional transactions can be inserted. The user 102 is shown the exact information he or she entered for a transaction, while the service provider server 180 sees a totally different destination account number and/or amount. In various aspects, the MITB-style malware is capable of extracting sensitive information (e.g., user name, password, social security number, credit card information, bank account information, account verification information, etc.) from the webpage.

In the typical MITB attack, installation code is launched and installs a malware kit. The malware kit adds new functionality to a web browser. The typical functions are to collect personal information or login credentials from the user device 120 or to use the user device 120 credentials to collect information from the service provider server 180 after the user 102 logs on to the service provider server 180. The malware 128 then sends the collected information to a third party (e.g., fraudulent server 130) for any of a variety of different undesired or nefarious uses.

The user device 120, in various embodiments, may include other applications as may be desired in one or more embodiments of the present disclosure to provide additional features available to user 102. In one example, such other applications may include security applications for implementing client-side security features, programmatic client applications for interfacing with appropriate application programming interfaces (APIs) over the network 160, and/or various other types of generally known programs and/or software applications. In still other examples, the other applications may interface with the user interface application for improved efficiency and convenience.

The user device 120, in one embodiment, may include at least one user identifier, which may be implemented, for example, as cookies associated with the user interface application 122, identifiers associated with hardware of the user device 120, or various other appropriate identifiers. The user identifier may include one or more attributes related to the user 102, such as personal information related to the user 102 (e.g., one or more user names, passwords, photograph images, biometric IDs, addresses, phone numbers, etc.) and banking information and/or funding sources (e.g., one or more banking institutions, credit card issuers, user account numbers, security data and information, etc.). In various implementations, the user identifier may be passed with a user login request to the service provider server 180 via the network 160, and the user identifier may be used by the service provider server 180 to associate the user 102 with a particular user account maintained by the service provider server 180.

The fraudulent server 130 receives and collects unauthorized data from the user device 120. For example, a normal log in webpage may include a box for a username, and another box for the user password. The normal log in webpage, however, may be intercepted by malware 128 to produce and display a different webpage on the user device 120 that includes a third box that requests account verification information. The user device 120 sends the username, password, and account verification information back to the service provider server 180, and also sends this information to the fraudulent server 130. The user 102 and the operator of the service provider server 180 are unaware that the fraudulent server 130 has fraudulently obtained the account verification information, username, and password.

The service provider server 180, in one embodiment, may be maintained by a transaction processing entity, which may provide processing for financial transactions and/or information transactions between the user 102 and one or more of merchants. As such, the service provider server 180 includes a service application 182, which may be adapted to interact with the user device 120 to facilitate the searching, selection, purchase, and/or payment of items by the user 102 from one or more merchants. In one example, the service provider server 180 may be provided by PayPal®, Inc., eBay® of San Jose, Calif., USA, and/or one or more financial institutions or a respective intermediary that may provide multiple point of sale devices at various locations to facilitate transaction routings between merchants and, for example, financial institutions.

The service application 182, in one embodiment, utilizes a payment processing application 184 to process purchases and/or payments for financial transactions between the user 102 and a merchant. In one implementation, the payment processing application 184 assists with resolving financial transactions through validation, delivery, and settlement. As such, the service application 182 in conjunction with the payment processing application 184 settles indebtedness between the user 102 and a merchant, wherein accounts may be directly and/or automatically debited and/or credited of monetary funds in a manner as accepted by the banking industry.

The service provider server 180, in one embodiment, may be configured to maintain one or more user accounts and merchant accounts in an account database 186, each of which may include account information 188 associated with one or more individual users (e.g., user 102) and merchants. For example, account information 188 may include private financial information of user 102 and one or more merchants, such as one or more account numbers, passwords, credit card information, banking information, or other types of financial information, which may be used to facilitate financial transactions between user 102 and one or more merchants. In various aspects, the methods and systems described herein may be modified to accommodate users and/or merchants that may or may not be associated with at least one existing user account and/or merchant account, respectively.

In one implementation, the user 102 has identity attributes stored with the service provider server 180, and user 102 has credentials to authenticate or verify identity with the service provider server 180. User attributes may include personal information, banking information and/or funding sources as previously described. In various aspects, the user attributes are passed to the service provider server 180 as part of a login, search, selection, purchase, and/or payment request, and the user attributes are utilized by the service provider server 180 to associate user 102 with one or more particular user accounts maintained by the service provider server 180.

The service provider server 180 also includes a malware module 190 for receiving requests for a webpage from the user device 120. As a response to the request, the malware module 190 generates or retrieves the webpage requested. In addition, the malware module 190 inserts a DOM inspector and/or a JS namespace inspector into the requested webpage. The DOM inspector checks the DOM of the webpage rendered on the user device 120 for anomalous DOM elements. For example, the DOM inspector can search for specific, known malicious DOM elements, or can compare the normal DOM elements (i.e., the DOM elements that should be on the webpage) to the DOM elements on the webpage rendered. In one embodiment, the DOM inspector enumerates all the DOM elements on the webpage rendered so that a comparison can be made. DOM elements that should not be present can then be sent to the service provider server 180. The DOM inspector uses JS or any other suitable language to inspect the DOM. The JS namespace inspector checks the JS namespace elements of the webpage rendered on the user device 120 for anomalous JS namespace elements. For example, the JS namespace inspector can enumerate all the functions and variables found on the rendered webpage. If the JS namespace inspector finds functions and/or variables that are not in the normal webpage, it is likely that malicious JS has been injected into the webpage. A message can then be sent to the service provider server 180 and/or the user device 120.

Figure 2A:
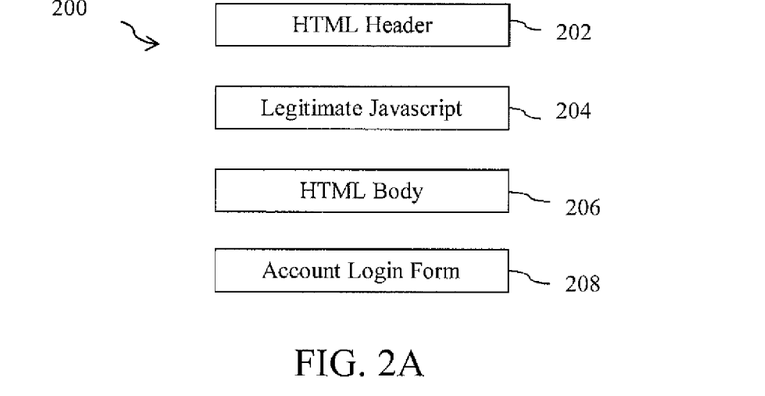
FIGS. 2A-2C are exemplary embodiments of a webpage that may be rendered on a user device according to the present disclosure.
Figure 2B:
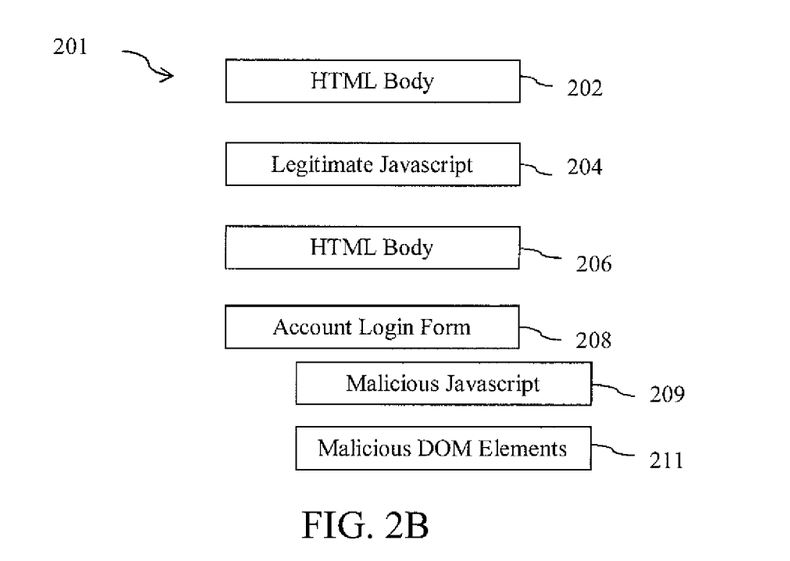
Figure 2C:
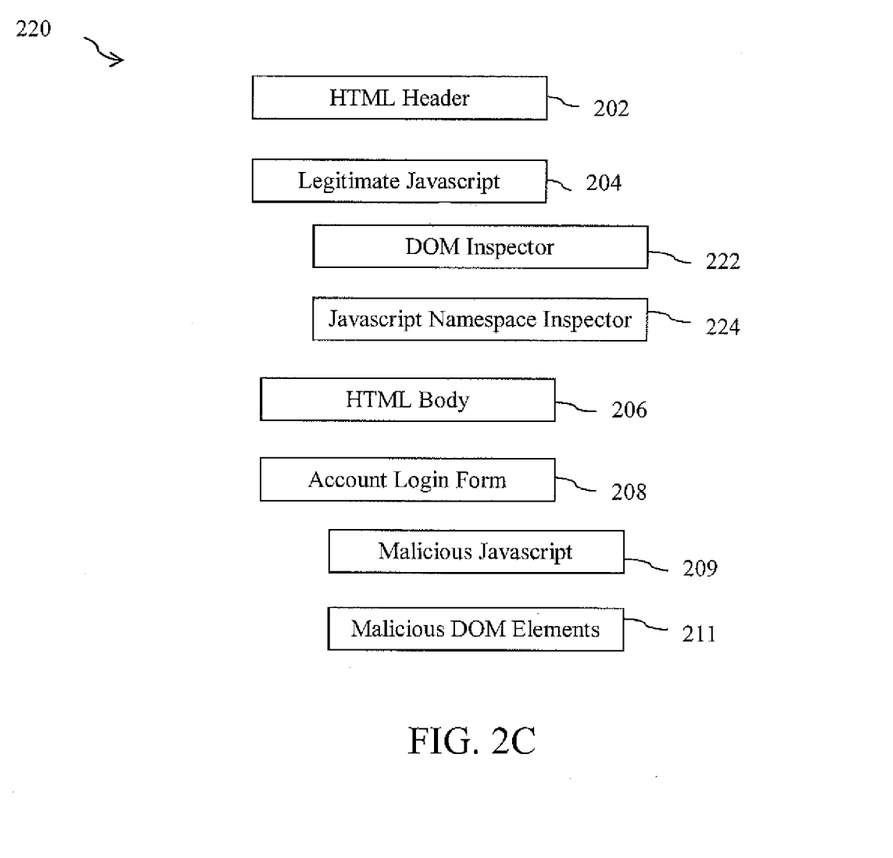

Turning now to FIGS. 2A-2C, illustrated are webpages that may be rendered on the user device 120. FIG. 2A shows the normal webpage 200, which includes an HTML header 202, legitimate JS 204, HTML body 206 and account login form 208. FIG. 2B shows an altered webpage 201 that includes injected malicious JS 209 and malicious DOM elements 211. The malware 128 modifies the normal webpage 200 to include the malicious components. FIG. 2C shows the webpage 220 with countermeasures according to the present disclosure to detect and report the malicious JS 209 and malicious DOM elements 211. The countermeasures include the DOM inspector 222 and the JS namespace inspector 224.

Figure 3:
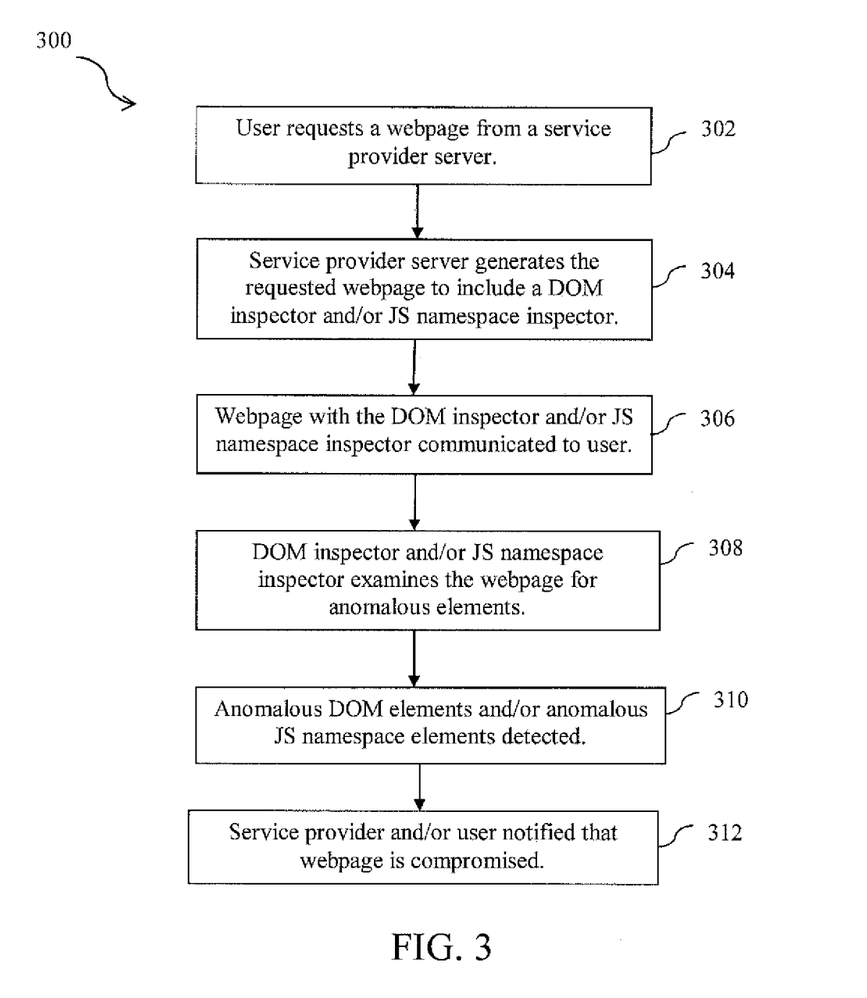
FIG. 3 is a flowchart showing a method for detecting fraudulent activity according to an embodiment of the present disclosure.

Referring now to FIG. 3, a flowchart of a method 300 for detecting fraudulent activity is illustrated according to an embodiment of the present disclosure. In an embodiment, at step 302, user 102 accesses a service provider site via the user device 120, and requests a webpage (e.g., log in page) from the service provider. The service provider server 180 receives the request.

At step 304, the malware module 190 of the service provider server 180 generates or retrieves the requested webpage and includes a DOM inspector and/or a JS namespace inspector in the webpage. In various embodiments, the DOM inspector may include a list of normal DOM elements that should be displayed on the requested webpage, and/or the JS namespace inspector may include a list of normal. JS namespace functions and variables that should be displayed on the requested webpage.

At step 306, the malware module 190 communicates the webpage with the DOM inspector and/or JS namespace inspector back to the user device 120. At this point, the malware 128 may modify the webpage to insert malicious JS 209 and/or malicious DOM elements 211. The modified webpage is read and displayed by the web browser 126, and the components of the webpage are copied to the DOM.

At step 308, the DOM inspector and/or the JS namespace inspector examine the modified webpage and check for anomalous DOM elements (e.g., malicious DOM elements 211) and/or anomalous JS namespace elements (e.g., malicious JS 209). In various embodiments, the DOM inspector enumerates the DOM elements in the modified webpage to identify, for example, malicious script elements, Internet Explorer JS elements, and markups that can be used to extract and steal confidential data.

In one embodiment, the DOM inspector looks for specific, known malicious DOM elements. For example, Zeus is a known Trojan horse that steals banking information using MITB-style malware. One malicious DOM element that Zeus injects into a normal webpage is "accountOverview." In another example, a malware sample named 'Parfeit Injection', malicious DOM elements such as "secform," "pppb," "pp_bal," "ppple," "pp_eml," "ppplle" "pp_last_log," and "i_pass" may be injected. In yet another example, in a Citadel-Lungfish attack, malicious DOM elements such as "fieldrowFirstName," "fieldrowLastName," "fieldrowCCNumber," "bankInfoCUP," "fieldrowCCExpDate," "fieldrowCSC," and "vbv_screen" may be injected into the webpage.

In a second embodiment, the DOM inspector compares the DOM elements for the normal webpage to the DOM elements for the modified webpage. If the DOM elements do not match, then there is a strong possibility that there is something in the webpage that should absolutely not be there. In some embodiments, the DOM inspector identifies the DOM elements that are different and sends them to the service provider server 180.

In a third embodiment, the DOM inspector inspects the DOM elements to determine whether they have the correct characteristic value. The characteristic value is typically determined by examining the number and/or values of specific elements in the webpage. The characteristic value is determined by traversing through all elements of a webpage and creating a value for each element. The characteristic value is a fingerprint that represents all the elements of a webpage. If the webpage has been modified, the characteristic value will also be modified. If the DOM inspector finds that the characteristic value is not correct, the DOM inspector can notify the service provider server 180 and/or the user device 120.

The JS namespace inspector, in various embodiments, also enumerates JS functions and variables to identify rogue code. In one embodiment, the JS namespace inspector looks for specific, known malicious JS functions and variables. In a second embodiment, the JS namespace inspector compares the JS functions and variables for the normal webpage to the JS functions and variables for the modified webpage. In a third embodiment, the JS namespace inspector inspects the JS functions and variables to determine whether they have the correct characteristic value. In all three embodiments, the JS namespace inspector can notify the service provider server 180 and/or the user device 120 if an anomalous JS namespace element is found.

At step 310, the DOM inspector and/or the JS namespace inspector detect an anomalous DOM element and/or anomalous JS namespace element in the webpage displayed to the user 102. At step 312, the DOM inspector and/or the JS namespace inspector transmit a message back to the service provider server 180 and/or the user device 120 that the webpage is compromised. The service provider may then take such action in response as it deems appropriate or is agreed with the user 102. This may include denial of any access, limiting access, preventing certain types of transactions, or any other response suitable to the circumstances.

Figure 4:
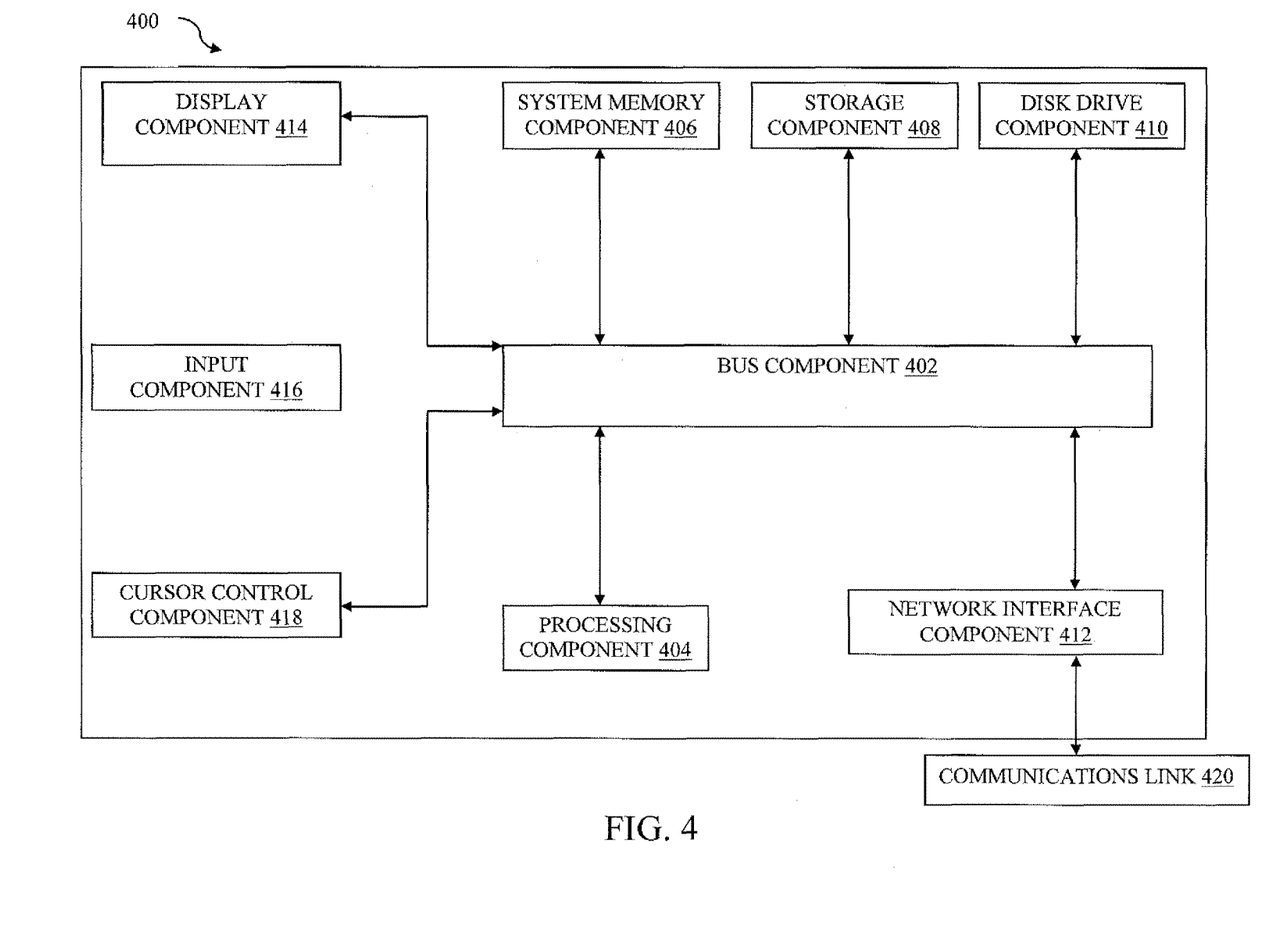
FIG. 4 is a block diagram of a system for implementing one or more components in FIG. 1, according to an embodiment of the present disclosure.

Referring now to FIG. 4, a block diagram of a system 400 is illustrated suitable for implementing embodiments of the present disclosure, including user device 120, fraudulent server 130, and service provider server or device 180. System 400, such as part of a cell phone, a tablet, a personal computer and/or a network server, includes a bus 402 or other communication mechanism for communicating information, which interconnects subsystems and components, including one or more of a processing component 404 (e.g., processor, micro-controller, digital signal processor (DSP), etc.), a system memory component 406 (e.g., RAM), a static storage component 408 (e.g., ROM), a network interface component 412, a display component 414 (or alternatively, an interface to an external display), an input component 416 (e.g., keypad or keyboard), and a cursor control component 418 (e.g., a mouse pad).

In accordance with embodiments of the present disclosure, system 400 performs specific operations by processor 404 executing one or more sequences of one or more instructions contained in system memory component 406. Such instructions may be read into system memory component 406 from another computer readable medium, such as static storage component 408. These may include instructions to process financial transactions, make payments, etc. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 404 for execution. Such a medium may take many forms, including but not limited to, non-volatile media, volatile media, and transmission media. In various implementations, volatile media includes dynamic memory, such as system memory component 406, and transmission media includes coaxial cables, copper wire, and fiber optics, including wires that comprise bus 402. Memory may be used to store visual representations of the different options for searching, auto-synchronizing, making payments or conducting financial transactions. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 400. In various other embodiments, a plurality of systems 400 coupled by communication link 420 (e.g., network 160 of FIG. 1, LAN, WLAN, PTSN, or various other wired or wireless networks) may perform instruction sequences to practice the disclosure in coordination with one another. Computer system 400 may transmit and receive messages, data, information and instructions, including one or more programs (i.e., application code) through communication link 420 and communication interface 412. Received program code may be executed by processor 404 as received and/or stored in disk drive component 410 or some other non-volatile storage component for execution.

In view of the present disclosure, it will be appreciated that various methods and systems have been described according to one or more embodiments for detecting fraudulent activity.

Although various components and steps have been described herein as being associated with user device 120, fraudulent server 130, and service provider server 180 of FIG. 1, it is contemplated that the various aspects of such servers illustrated in FIG. 1 may be distributed among a plurality of servers, devices, and/or other entities.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method for detecting malicious code in a rendered webpage, comprising:
   receiving, via a network by one or more hardware processors of a server, a request for a webpage from a user device;
   embedding, by the one or more hardware processors of the server, within the webpage (i) data indicating a plurality of elements that are expected to be rendered when the webpage is loaded and (ii) a malware module comprising software instructions that, when executed by the user device, cause the user device to identify a set of elements rendered at the user device based on the webpage, compare the set of identified elements to the plurality of elements that are expected to be rendered when the webpage is loaded to detect an identity of an anomalous element within the rendered webpage, and transmit the identity of the anomalous element to the server;
   communicating, by the one or more hardware processors of the server and via the network, the webpage having the embedded data and the embedded malware module to the user device; and
   in response to receiving, by the one or more hardware processors of the server from the user device via the network, the identity of the anomalous element that has been detected in the rendered webpage, limiting or denying access by the user device to the webpage based on the identity of the anomalous element.

2. The method of claim 1, further comprising transmitting, by the one or more hardware processors of the server, a message to the user device indicating that the webpage is compromised.

3. The method of claim 1, wherein the limiting the access to the webpage by the user device includes preventing the user device from performing certain types of transactions via the webpage.

4. The method of claim 1, wherein the webpage is configured to accept an account number, a password, account verification information, or a combination thereof.

5. The method of claim 1, wherein the plurality of elements that are expected to be rendered when the webpage is loaded comprises a document object model (DOM) element, a JavaScript (JS) function call, and a JS variable.

6. The method of claim 1, wherein the anomalous element detected in the rendered webpage is an element contained in a group consisting of "accountOverview," "secform," "pppb," "pp_bal," "ppple," "pp_eml," "ppplle," "pp_last_log," and "i_pass".

7. The method of claim 1, wherein the anomalous element detected in the rendered webpage is-an element contained in a group consisting of "fieldrowFirstName," "fieldrowLastName," "fieldrowCCNumber," "bankInfoCUP," "fieldrowCCExpDate," "fieldrowCSC," and "vbv_screen".

8. A non-transitory machine-readable medium having stored thereon machine-readable instructions executable to cause a machine to perform operations comprising:
   receiving, via a network, a request for a webpage from a user device;
   embedding within the webpage (i) check data indicating a plurality of elements that are expected to be rendered when the webpage is loaded and (ii) a malware module comprising software instructions that, when executed by the user device, cause the user device to identify a set of elements rendered at the user device based on the webpage, compare the set of identified elements to the plurality of elements that are expected to be rendered when the webpage is loaded to detect an identity of an anomalous element within the rendered webpage, and transmit the identity of the anomalous element to a server;
   transmitting the webpage having the embedded check data and the embedded malware module to the user device; and
   in response to receiving, from the user device via the network, the identity of the anomalous element that has been detected in the rendered webpage, limiting or denying access by the user device to the webpage based on the identity of the anomalous element.

9. The non-transitory machine-readable medium of claim 8, wherein the operations further comprise, based on the detected identity of the anomalous element in the rendered webpage, transmitting, to the user device, a message indicating that the rendered webpage contains an anomalous element.

10. The non-transitory machine-readable medium of claim 8, wherein limiting access to the webpage comprises preventing the user device from performing certain types of transactions via the webpage.

11. The non-transitory machine-readable medium of claim 8, wherein the plurality of elements that are expected to be rendered when the webpage is loaded comprises a document object model (DOM) element, a JavaScript (JS) function call, and a JS variable.

12. The non-transitory machine-readable medium of claim 8, wherein the identified anomalous element in the rendered webpage is an element contained in a group consisting of "accountOverview," "secform," "pppb," "pp_bal," "ppple," "pp_eml," "ppplle," "pp_last_log," and "i_pass".

13. The non-transitory machine-readable medium of claim 8, wherein the identified anomalous element in the rendered webpage is an element contained in a group consisting of "fieldrowFirstName," "fieldrowLastName," "fieldrowCCNumber," "bankInfoCUP," "fieldrowCCExpDate," "fieldrowCSC," and "vbv_screen".

14. A system, comprising:
a non-transitory memory; and
one or more hardware processors coupled to the non-transitory memory and configured to read instructions from the non-transitory memory to cause the system to perform operations comprising:
receiving, from a user device via a network, a request for a webpage;
embedding within the webpage (i) check data indicating a plurality of elements that are expected to be rendered when the webpage is loaded and (ii) a malware module comprising software instructions that, when executed by the user device, cause the user device to identify a set of elements rendered at the user device based on the webpage, compare the set of identified elements to the plurality of elements that are expected to be rendered when the webpage is loaded to detect an identity of an anomalous element within the rendered webpage, and transmit the identity of the anomalous element to a server;
transmitting the webpage having the embedded check data and the embedded malware module to the user device via the network; and
in response to receiving, from the user device via the network, the identity of the anomalous element that has been detected in the rendered webpage, limiting or denying access by the user device to the webpage based on the identity of the anomalous element.

15. The system of claim 14, wherein the operations further comprise based on the identity of the anomalous element detected in the rendered webpage, transmitting, to the user device, a message indicating that the rendered webpage contains an anomalous element.

16. The system of claim 14, wherein limiting access to the webpage includes preventing the user device from performing certain types of transaction via the webpage.

17. The system of claim 14, wherein the webpage is configured to accept an account number, a password, account verification information, or a combination thereof.

18. The system of claim 14, wherein the plurality of elements that are expected to be rendered when the webpage is loaded comprises a document object model (DOM) element, a JavaScript (JS) function call, and a JS variable.

19. The system of claim 14, wherein the identified anomalous element in the rendered webpage is an element contained in a group consisting of "accountOverview," "secform," "pppb," "pp_bal," "ppple," "pp_eml," "ppplle," "pp_last_log," and "i_pass".

20. The system of claim 14, wherein the identified anomalous element in the rendered webpage is an element contained in a group consisting of "fieldrowFirstName," "fieldrowLastName," "fieldrowCCNumber," "bankInfoCUP," "fieldrowCCExpDate," "fieldrowCSC," and "vbv_screen".

* * * * *

UNITED STATES PATENT AND TRADEMARK OFFICE
CERTIFICATE OF CORRECTION

Page 1 of 1

PATENT NO.          : 10,015,191 B2
APPLICATION NO.     : 14/030950
DATED               : July 3, 2018
INVENTOR(S)         : Jeremy Dale Pickett and Brad Wardman It is certified that error appears in the above-identified patent and that said Letters Patent is hereby corrected as shown below:

In the Specification

In the Detailed Description:

In Column 7, Line 2, change "normal. JS" to --normal JS--.

In the Claims

In Claim 7, Column 10, Line 37, change "webpage is-an" to --webpage is an--.

Signed and Sealed this
Second Day of October, 2018

Andrei Iancu
*Director of the United States Patent and Trademark Office*